United States Patent Office 3,393,035
Patented July 16, 1968

3,393,035
MOUNTING FOR MICA INTERFERENCE FILTERS
Jerzy Adam Dobrowolski, Ottawa, Ontario, Canada, assignor to Canadian Patents and Development Limited, Ottawa, Ontario, Canada, a corporation of Canada
Filed June 25, 1965, Ser. No. 466,947
1 Claim. (Cl. 350—318)

ABSTRACT OF THE DISCLOSURE

A mounting for mica interference filter flakes in which a flat frame structure has a circular central opening of slightly less diameter than that of the mica flake and a raised inner rim defining a groove between it and the main portion of the frame for holding adhesive material. The rim has a flat top surface for positioning said mica flake whose edge extends over the edge of the rim closest to the groove and which is bonded to the frame by the adhesive material at an elevated temperature. The frame is made of a material selected to have a coefficient of thermal expansion which in the temperature range between the elevated temperature and normal operating temperatures is less than that of the mica flake.

---

This invention relates to a mounting means for mica interference filters and the like.

It is usually necessary for optical reasons to mount mica interference filters such that the base spacer layer is in uniform radial tension. One method of mounting mica interference filters is described and claimed in my U.S. Patent No. 3,039,362 which issued on June 19, 1962. In that patent a mounting means comprising two flat annular rings one of which carries an O-ring in a groove is described. The mica filter is clamped between the two rings and the O-ring under compression tends to stretch and flatten the filter. This mounting design has worked well and has received commercial acceptance. However, because the annular rings are normally made of metal and are relatively bulky, this mounting has been inconvenient for handling and storage reasons. In addition it is often necessary to re-adjust the mounting after periods of time or after use in extreme environmental conditions. It is an object of the present invention to provide a mounting for thin flat objects that is light, strong, easily handled and stored and which will provide the necessary radial tensioning to the object.

Another object of the invention is to provide a mounting that is permanent and does not require further readjustment from time to time.

These and other objects of the invention are achieved by providing a mounting for thin, flat articles comprising an open frame structure having an inner edge or rim to which the periphery of the flat object is adhesively attached at an elevated temperature such that when the assembly returns to normal operating temperatures the said frame imparts a radially acting tentioning force to the flat object, said open frame structure being made of a solid material that has a coefficient of thermal expansion which in the temperature range between normal operating temperatures and the temperature at which the flat article is adhesively attached to the said frame is less than that of the flat article but not so much less as to cause undue stress to break or rupture the said flat article.

Figure 1:
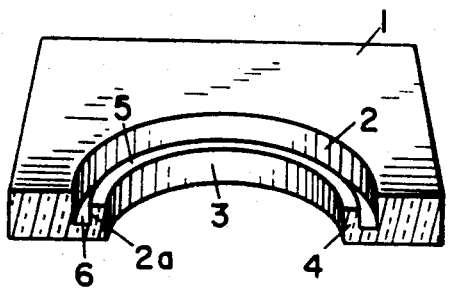
Figure 2:
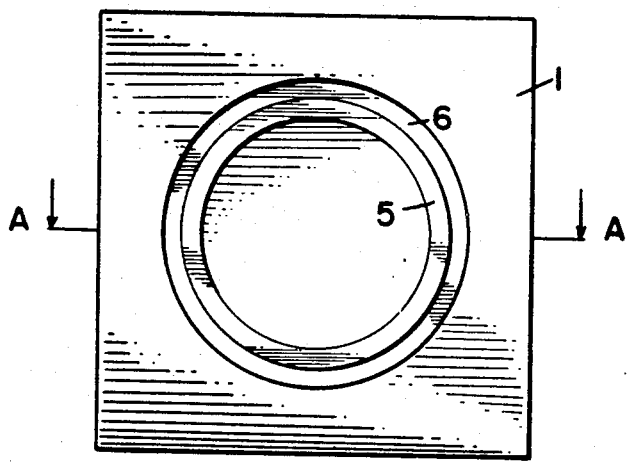
Figure 3:
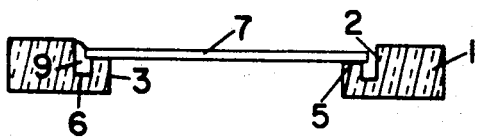

In drawings which illustrate an embodiment of the invention:

FIGURE 1 is a three-quarter view (broken) of the mounting frame structure before the mounting of the flat article, FIGURE 2 is a plan view of a complete frame structure before mounting, and FIGURE 3 is a cross-section on the line A—A of the frame structure of FIGURE 2 but which also shows the flat article mounted in position.

Referring to FIGURE 1, a flat glass plate 1 which is conveniently square or rectangular in outer dimensions for storage and handling reasons but which could equally well to any other derived outer shape forms the mounting frame stducture. Part of the plate is broken away to more readily shown the formation of the central mounting structure. In addition, the plate is shown with exaggerated vertical dimension for purposes of illustration. A central opening or aperture is formed in the glass plate as defined by a first inner wall 3. It will be realized that the size of this opening which will normally be circular defines the operative area of the flat object to be mounted. A surrounding circular slot or groove defined by a second inner wall 2, floor 6, and outward facing wall 2a is cut as shown. A raised edge or rim 5 is formed as shown with the height of edge or rim 5 being somewhat less than the main surface of the flat plate 1.

FIGURE 2 is a plan view of a complete plate showing the relationship of raised rim 5 with the slot floor 6.

FIGURE 3 is a cross-section on the line A—A of FIGURE 2 and shows the mounting of a flat object 7, in this case a mica interference filter. The flake of mica is placed on the raised edge of rim 5 which is preferably ground or cut as flat as possible for optical reasons and the slot or groove is filled with an adhesive bonding material 9 which, when set, will adhesively hold the mica flake in position around its periphery.

The purpose of the slot or groove is that the edge of the mica, which may be frayed or damaged from the cutting, will be suspended and will not rest on the rim 5. If this is not the case this damage edge may make it difficult or impossible to obtain the desired degree of flatness. The width of the raised rim is kept small for the same reason; the chances of dust particles settling on the wide rim are larger.

Examples of suitable adhesive materials that may be used are glass solder (setting temperature approx. 420° C.) an epoxy resin cement (curing temperature approx. 120° C.). To carry out the above mounting operation the assembly (mounting frame structure and mica flake) are heated to or just above the setting or curing temperature of the adhesive. After the adhesive bond is formed between the mica and the frame structure, the assembly is allowed to cool down to room temperature.

The frame structure must be made of a material normally a glass that has a coefficient of thermal expansion which, in the temperature range between ordinary optical operating temperatures for the filters (normally room temperature but in some instances somewhat higher) and the curing or setting temperature of the adhesive material used, is less than that of the flat object (mica). As cooling takes place, the frame structure having a lower coefficient of exansion, contracts less than the mica, this imparts a rapidly acting tensioning force on the periphery of the mica keeping it stretched flat across the flat surface of rim or edge 5.

There are a large number of different types of glass commercially available that have the required thermal expansion characteristics for this purpose. Information in regards to glass characteristics is readily obtainable from the glass manufacturers.

One advantage of this type of mounting when used for interference filters is that the mica may be mounted in the frame before the interference layers are applied to its surfaces. In this way, filters will not have to be rejected due to faulty mounting after the evaporation coating steps have been carried out.

What is claimed is:

1. A mounting means for mica interference filter flakes comprising a flat frame structure having a circular central opening of slightly less diameter than that of the said mica flake and a raised inner rim defining a groove between it and the main portion of said frame structure, said groove being of such dimensions as to hold adhesive material for attachment of the mica flake to the said frame structure at an elevated temperature, said inner rim having a generally flat top surface lying below that of the surface of the said frame structure for positioning the mica flake, said mica flake being of such size that its edge extends over the edge of the said rim nearest the groove, and said frame structure being made of a solid material that has a coefficient of thermal expansion which in the temperature range between the elevated temperature and normal operating temperatures is less than that of the said mica flake but not so much less as to cause undue stress to rupture the flake.

References Cited

UNITED STATES PATENTS

| | | | |
|---|---|---|---|
| 2,977,017 | 3/1961 | Herzig | 156—108 |
| 3,039,362 | 6/1962 | Dobrowolski | 350—166 |

ROBERT F. BURNETT, *Primary Examiner.*

R. H CRISS, *Assistant Examiner.*